US007588118B2

(12) United States Patent
Sawada

(10) Patent No.: US 7,588,118 B2
(45) Date of Patent: Sep. 15, 2009

(54) WORK MACHINE WITH ENGINE CONTROL DEVICE

(75) Inventor: Hiroshi Sawada, Neyagawa (JP)

(73) Assignee: Komatsu Ltd., Tokyo (JP)

( * ) Notice: Subject to any disclaimer, the term of this patent is extended or adjusted under 35 U.S.C. 154(b) by 659 days.

(21) Appl. No.: 10/555,524

(22) PCT Filed: Apr. 9, 2004

(86) PCT No.: PCT/JP2004/005175

§ 371 (c)(1),
(2), (4) Date: Nov. 3, 2005

(87) PCT Pub. No.: WO2004/099593

PCT Pub. Date: Nov. 18, 2004

(65) Prior Publication Data

US 2006/0229786 A1 Oct. 12, 2006

(30) Foreign Application Priority Data

May 7, 2003 (JP) ............................ 2003-128612

(51) Int. Cl.
*B60K 3/00* (2006.01)

(52) U.S. Cl. ...................................... 180/302; 180/242

(58) Field of Classification Search ................. 180/302, 180/333, 315, 242, 53.4, 69.3, 301, 89.12; 70/50, 36; 60/607, 431, 449, 629, 428
See application file for complete search history.

(56) References Cited

U.S. PATENT DOCUMENTS 5,077,973 A * 1/1992 Suzuki et al. ................ 60/428
5,274,557 A * 12/1993 Moriya et al. ................ 701/50
5,628,188 A * 5/1997 Kordak ........................ 60/449
5,638,677 A * 6/1997 Hosono et al. ................ 60/431
5,967,756 A * 10/1999 Devier et al. ................. 417/18
6,371,214 B1 * 4/2002 Anwar et al. .................. 701/50
6,546,724 B2 * 4/2003 Nishimura et al. ............ 60/431
6,564,548 B2 * 5/2003 Nishimura et al. ............ 60/431
6,635,973 B1 * 10/2003 Kagoshima et al. ........ 307/10.1
6,935,114 B2 * 8/2005 Hajek et al. .................. 60/629
7,032,379 B2 * 4/2006 Ohtsuki ....................... 60/449
7,076,954 B1 * 7/2006 Sopko et al. .................. 60/607

FOREIGN PATENT DOCUMENTS

EP 1 398 512 A1 3/2004

(Continued)

*Primary Examiner*—Hau V Phan
(74) *Attorney, Agent, or Firm*—Frishauf, Holtz, Goodman & Chick, P.C.

(57) ABSTRACT

A work machine with an engine control device is provided, which is capable of ensuring fine controllability and providing further improved fine controllability with a simple construction. To this end, the work machine includes: an engine control device for controlling the output of an engine in accordance with each of a plurality of operation modes which are set according to the contents of operations; and operation mode selector switches for selecting any one of the plurality of operation modes. If the operation mode selector switches select, from the plurality of operation modes, an operation mode for setting a set revolution speed for the engine to a relatively low value, the engine control device performs isochronous control for maintaining the revolution speed of the engine to a constant value irrespective of load fluctuations.

4 Claims, 8 Drawing Sheets

FOREIGN PATENT DOCUMENTS

| | | | |
|---|---|---|---|
| JP | 7-127493 | A | 5/1995 |
| JP | 10-89111 | A | 4/1998 |
| JP | 10-273919 | A | 10/1998 |
| JP | 11-107322 | A | 4/1999 |
| JP | 2001-295674 | A | 10/2001 |
| WO | WO 03/001067 | A1 | 1/2003 |

* cited by examiner

WORK MACHINE WITH ENGINE CONTROL DEVICE

This application is a U.S. National Phase Application under 35 USC 371 of International Application PCT/JP2004/005175 filed Apr. 9, 2004.

TECHNICAL FIELD

The present invention relates to a work machine with an engine control device.

BACKGROUND ART

Hydraulic excavators, for example, are conventionally used for a wide variety of operations such as excavation, craning and leveling and therefore are required to have the capability of performing effective excavation, while keeping fine controllability needed for craning and leveling operations.

One hydraulic excavator which meets the above requirement is set out in, e.g., Japanese Patent Publication No. 3316057. The hydraulic excavator proposed in this publication includes hydraulic actuators activated by pressure oil from a variable displacement hydraulic pump driven by an engine; an operating speed detecting means for detecting the change rate of operation amount of a control lever for operating a hydraulic actuator; and an engine revolution speed controlling means for controlling engine revolution speed. If the change rate of operating amount detected by the operating speed detecting means is lower than a specified value, the revolution speed of the engine is kept to a preset speed by the engine revolution speed controlling means. Specifically, during the operation in which the change rate of operating amount of the control lever is small such as craning and leveling, increasing/decreasing of engine revolution speed is inhibited so as not to affect the fine control. On the other hand, during the operation in which the change rate of operating amount detected by the operating speed detecting means is higher than the specified value, the engine revolution speed controlling means increases the revolution speed of the engine from the preset speed according to the load imposed on the hydraulic actuator. That is, since the change rate of operating amount of the control lever during excavation is higher than those of craning and leveling operations, the revolution speed of the engine is increased according to work load, thereby effectively performing excavation.

The hydraulic excavator disclosed in the above publication, however, cannot avoid complication of the control system, because it is designed to control the revolution speed of the engine by the engine revolution speed controlling means based on the change rate of operating amount of the control lever detected by the operating speed detecting means. In addition, since the threshold for determining whether the change rate of operating amount is high or low is set based on the operational feeling of the operator, the recall factor of the operational effect is likely to vary under the influence of the physical condition of the operator or the individual difference between the operators when a plurality of operators use the work machine in cooperation.

The present invention is directed to overcoming the foregoing problem and a primary object of the invention is therefore to provide a work machine with an engine control device which is capable of ensuring reliable fine controllability and providing further improved fine controllability with a relatively simple construction.

DISCLOSURE OF THE INVENTION

In accomplishing the above and other objects, there has been provided, in accordance with the present invention, a work machine with an engine control device, the machine comprising:

hydraulic actuators activated by pressure oil from a hydraulic pump driven by an engine;

an implement driven by the activation of the hydraulic actuators;

an engine control device for controlling the output of the engine in accordance with each of a plurality of operation modes which are set according to the contents of operations; and operation mode selecting means for selecting any one of the plurality of operation modes, wherein after a specified operation mode has been selected from the plurality of operation modes by the operation mode selecting means, the engine control device performs isochronous control for maintaining the revolution speed of the engine to a constant value irrespective of load fluctuations.

In the invention, if a specified operation mode is selected by the operation mode selecting means from the plurality of operation modes which are set according to the contents of operations, the isochronous control is performed by the engine control device so that the revolution speed of the engine is maintained to a constant value irrespective of load fluctuations. Therefore, even if a load fluctuation occurs, the operational speed of the implement can be constantly maintained, thereby ensuring good fine controllability. In addition, the invention has the advantage that such an operational effect can be attained by a relatively simple control system which performs the isochronous control only when a specified operation mode is selected. Since this operational effect can be obtained without fail whenever the operation mode selecting means selects the specified operation mode, there is no likelihood that the recall factor of the operational effect varies as seen in the conventional machine.

The invention is preferably designed such that the specified operation mode is a finely-controlled operation mode for allowing the implement to operate at ultraslow speed which mode is among the plurality of operation modes, and if an operation mode for setting a set revolution speed for the engine to a value in the vicinity of a rated output revolution speed is selected from the plurality of operation modes by the operation mode selecting means, the engine control device performs regulation control for increasing/decreasing the revolution speed of the engine according to load fluctuations. When the finely-controlled operation mode suited for operation of the implement at ultraslow speed is selected, in more concrete words, the finely-controlled operation mode which is set so as to allow, for instance, a hydraulic excavator to properly perform craning or leveling operation is selected, the engine control device is allowed to perform the isochronous control, so that the implement can be easily operated at constant ultraslow speed through a relatively rough manipulation and as a result, further improved fine controllability can be achieved. In addition, if the operation mode for setting a set revolution speed for the engine to a value in the vicinity of the rated output revolution speed is selected from the plurality of operation modes by the operation mode selecting means, the regulation control is performed by the engine control device, whereby the operator can grasp the degree of work load fluctuations based on increases/decreases in the revolution speed of the engine. This enables the operator to make right manipulation in the course of operation so that the operation can be smoothly carried out without troubles.

In the invention, it is preferable that the specified operation mode be the finely-controlled operation mode for allowing the implement to operate at ultraslow speed which mode is among the plurality of operation modes and an operation mode for setting a set revolution speed for the engine to a value in the vicinity of a rated output revolution speed which mode is among the plurality of operation modes. This not only increases the fine controllability similarly to the above-described arrangement but also allows the engine control device to perform the isochronous control when the operation mode for setting a set revolution speed for the engine to a value in the vicinity of the rated output revolution speed is selected, so that even if the work machine is suddenly brought into an unloaded condition during operation, the revolution speed of the engine will not be increased. In addition, the set revolution speed for the engine during unloaded operation itself can be set low, so that vibration and noise can be reduced.

In the invention, it is preferable that the engine control device perform equi-horse-power control subsequently to the isochronous control, if the value of the output torque of the engine which the load requires still increases after reaching a specified value when the finely-controlled operation mode is selected. This enables it to increase the output torque while restraining changes in the revolution speed of the engine caused by increases in the load. As a result, high-load operation can be smoothly performed without impairing the fine controllability. During this time, the output of the engine is substantially constant, so that no wasteful energy consumption occurs.

BEST MODE FOR CARRYING OUT THE INVENTION

Referring now to the accompanying drawings, a work machine with an engine control device will be described according to preferred embodiments of the invention. These embodiments are associated with cases where the invention is applied to a hydraulic excavator which is one kind of work machines.

Figure 1:
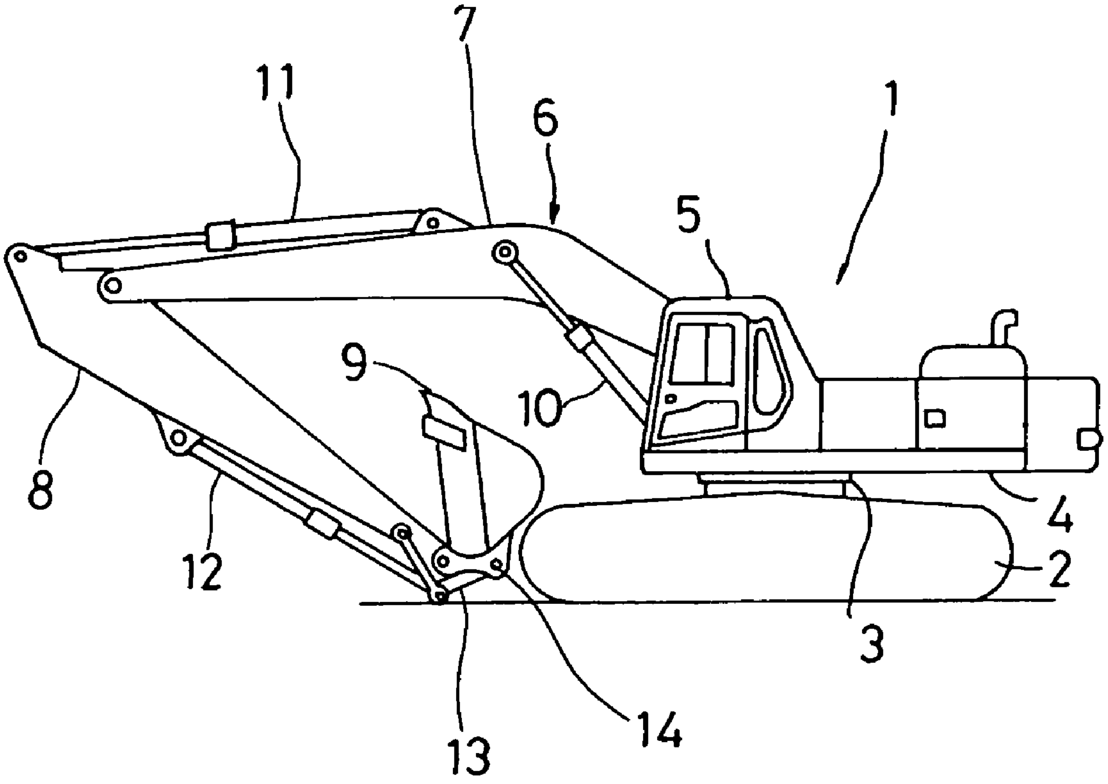
FIG. 1 is a side view of a hydraulic excavator constructed according to a first embodiment of the invention.

FIG. 1 shows a side view of a hydraulic excavator according to a first embodiment of the invention.

The hydraulic excavator 1 has lower machinery 2 designed to freely travel, being driven by a hydraulic motor for traveling (not shown); upper machinery 4 mounted on the lower machinery 2 through a swivel 3 which uses a hydraulic motor for turning (not shown) as a driving source; and an implement 6 attached to the upper machinery 4. The implement 6 is constituted by a boom 7, an arm 8 and a bucket 9 which are respectively pivotally arranged in this order from a side of the upper machinery 4. The boom 7, the arm 8 and the bucket 9 are pivotally operated by expansion/contraction of a boom cylinder 10, an arm cylinder 11 and a bucket cylinder 12, respectively. The upper machinery 4 includes an operator's cab 5 which has, therein, an operating system (not shown) for operating the hydraulic actuators (i.e., the hydraulic motor for traveling; hydraulic motor for turning; boom cylinder 10, arm cylinder 11 and bucket cylinder 12) and a monitor panel 20 (see FIG. 2) which is composed of a monitor for displaying various indicators and an operating unit having various switches. In this hydraulic excavator 1, a suspending hook (not shown) is attached to a pin 14 for coupling the bucket 9 to a bucket link 13 which constitutes a pivotal movement mechanism for the bucket 9, so that not only excavation and leveling, but also craning can be performed.

Figure 2:
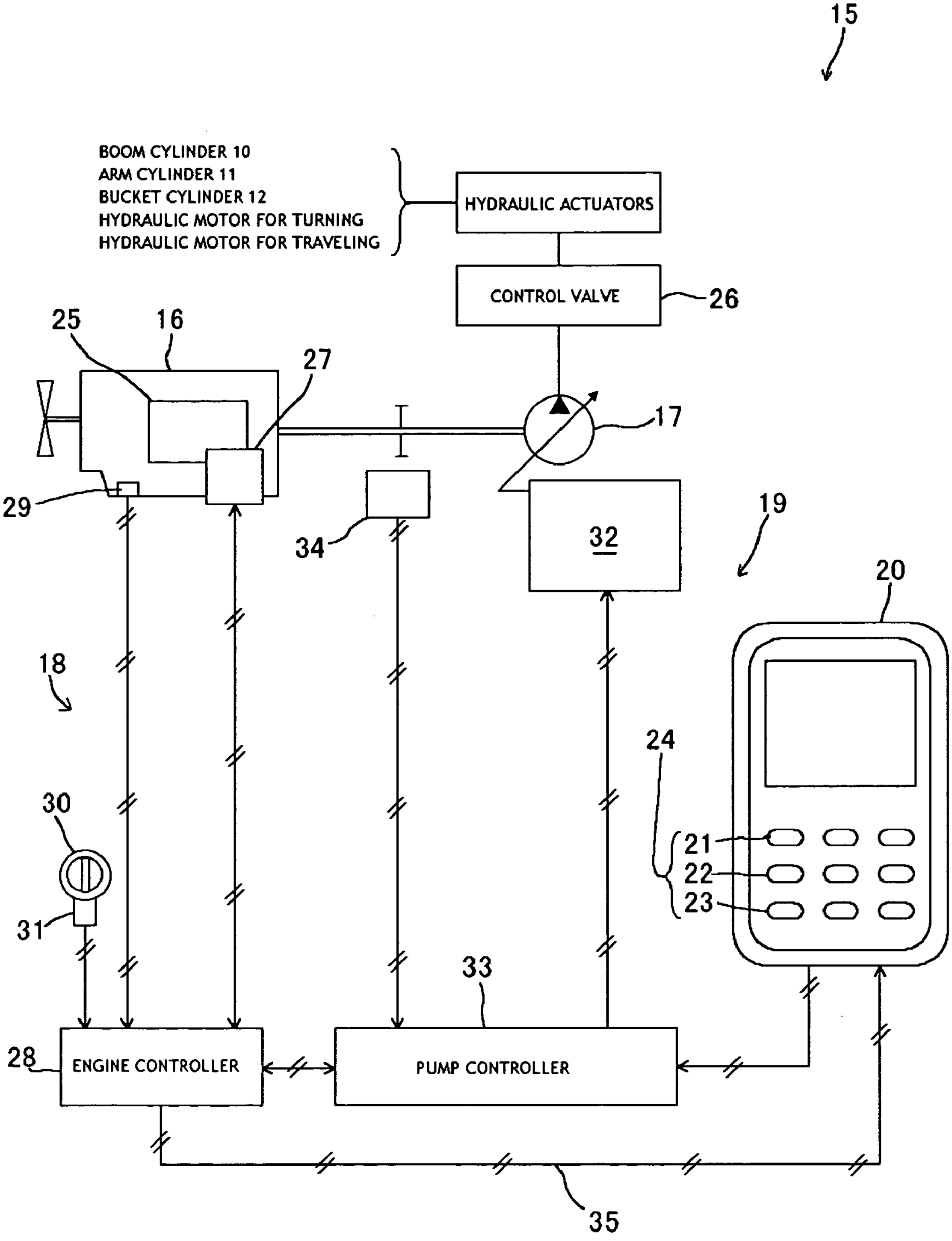
FIG. 2 is a block diagram showing a schematic structure of an engine/hydraulic control system according to the first embodiment.

Next, reference is made to the block diagram of FIG. 2 to fully describe an engine/hydraulic control system according to the first embodiment of the invention.

The engine/hydraulic control system 15 of the first embodiment includes a diesel engine 16; a variable displacement hydraulic pump 17 driven by the engine 16; an engine control device 18 for controlling the output of the engine 16; a pump control device 19 for controlling the delivery characteristics of the hydraulic pump 17; and operation mode selector switches (operation mode selecting means) 24 (an active mode selector switch 21, excavation mode selector switch 22 and lifting mode selector switch 23) which are provided in the operating unit of the monitor panel 20, for selecting an operation mode from a plurality of operation modes (described later) set according to the contents of operations.

The engine 16 is equipped with a fuel injection pump 25 for emitting a jet of fuel into the fuel chamber of the engine 16. An explanation of this fuel injection pump 25 in conjunction with the drawings will be omitted. This pump 25 includes (i) a force-feeding mechanism composed of a plunger for applying high pressure to the fuel to forcibly send to an injection pipe and a cum shaft; (ii) a force-feeding amount adjusting mechanism which includes a control rack engaged with the plunger, for adjusting the feeding amount of the fuel pressure-fed by the force-feeding mechanism, by changing the rack position of the control rack.

The hydraulic pump 17 is connected to the hydraulic actuators through a control valve 26. In the control valve 26, switch-over of oil paths is done by operation of each of operating levers which are disposed in the operating system in correspondence with the hydraulic actuators. The operator operates each operating lever in a predetermined manner so that its associated hydraulic actuator is supplied with pressure oil from the hydraulic pump 17 to allow the traveling motion of the lower machinery 2, the turning motion of the upper machinery 4, or the flexing/hoisting motion of the implement 6.

The engine control device 18 has (i) an electronic governor 27 for controlling the rack position of the control rack provided for the force-feeding amount adjusting mechanism of the fuel injection pump 25; and (ii) an engine controller 28 for transmitting a governor drive signal to the electronic governor 27. Input to the engine controller 28 are engine revolution speed detection signal from a revolution sensor 29 for detecting the revolution speed of the engine 16 and a throttle signal from a throttle sensor 31 for detecting the operation amount of a fuel dial 30.

The pump control device 19 is composed of a swash plate drive unit 32 for inclining a swash plate provided for the hydraulic pump 17 and a pump controller 33 for controlling the activation of the swash plate drive unit 32. Input to the pump controller 33 are a pump revolution speed detection signal from a revolution sensor 34 for detecting the revolution speed (=engine revolution speed) of the hydraulic pump 17 and an operation mode selection signal from the operation mode selector switches 24.

Signal transmission/reception is possible between the engine controller 28 and the pump controller 33. The operation mode selection signal input to the pump controller 33 from the monitor panel 20 is sent to the engine controller 28 as a mode command signal. The mode command signal transmitted from the pump controller 33 is input to the engine controller 28. In the engine controller 28, the operation mode which has been selected through the selecting operation of the operation mode selector switches 24 is identified based on the input mode command signal, and a predetermined governor drive signal is transmitted to the electronic governor 27 so that the output characteristic of the engine 16 becomes correspondent with the selected operation mode. Reference numeral 35 designates a signal line for transmitting information about the engine 16 to the monitor panel 20. The information about the engine 16 transmitted through this signal line is displayed on the monitor provided for the monitor panel 20. In the pump controller 33, based on a target revolution speed signal which has been sent from the engine controller 28, indicating a target revolution speed for the engine 16 set by the fuel dial 30 and based on a pump revolution speed detection signal indicative of the revolution speed of the pump detected by the revolution sensor 34, the discharge rate of the hydraulic pump 17 is controlled by the swash plate drive unit 32 such that the best matching torque at each output point of the engine 16 is taken in the hydraulic pump 17, and equi-horse-power control is performed in each operation mode in order to make a matching at a point where the fuel efficiency of the engine 16 is high (see the equi-horse-power curves designated by Pa and Pb in FIG. 3).

The operation modes set in the first embodiment consist of three modes, i.e., active mode, excavation mode and lifting mode (finely-controlled operation mode). Herein, the active mode is set in correspondence with operation which requires speed and power. The excavation mode is for enabling ordinary excavating operation in an output region where the fuel efficiency of the engine 16 is good, whereas the lifting mode is set in correspondence with operation which requires fine controllability such as craning and leveling. In the first embodiment, the output of the engine 16 is controlled by the engine control device 18 in accordance with each of the operation modes.

In the first embodiment, the following two types of control are performed on the engine 16 by the engine control device 18.

One is called "regulation control (droop control)". This regulation control is such that after a target revolution speed for the engine 16 is set by the fuel dial 30 during unloaded operation (idling) of the engine 16, the revolution speed of the engine 16 decreases as work load increases.

The other control is called "isochronous control". In this isochronous control, the revolution speed of the engine 16 is maintained to a constant value, irrespective of the fluctuation of work load. More specifically, in the isochronous control, the engine controller 28 determines a set revolution speed in response to a throttle signal sent from the throttle sensor 33 and a mode command signal sent from the pump controller 33. Then, the engine controller 28 makes a comparison between the set revolution speed and the actual revolution speed of the engine 16, thereby determining a target rack position for the control rack of the fuel injection pump 25 and transmits a drive signal to the electronic governor 27, for executing feedback control so as to make the actual rack position equal to the target rack position. Thus, the amount of fuel injection is controlled, thereby maintaining the revolution speed of the engine 16 to a constant value irrespective of the fluctuation of work load.

Figure 3:
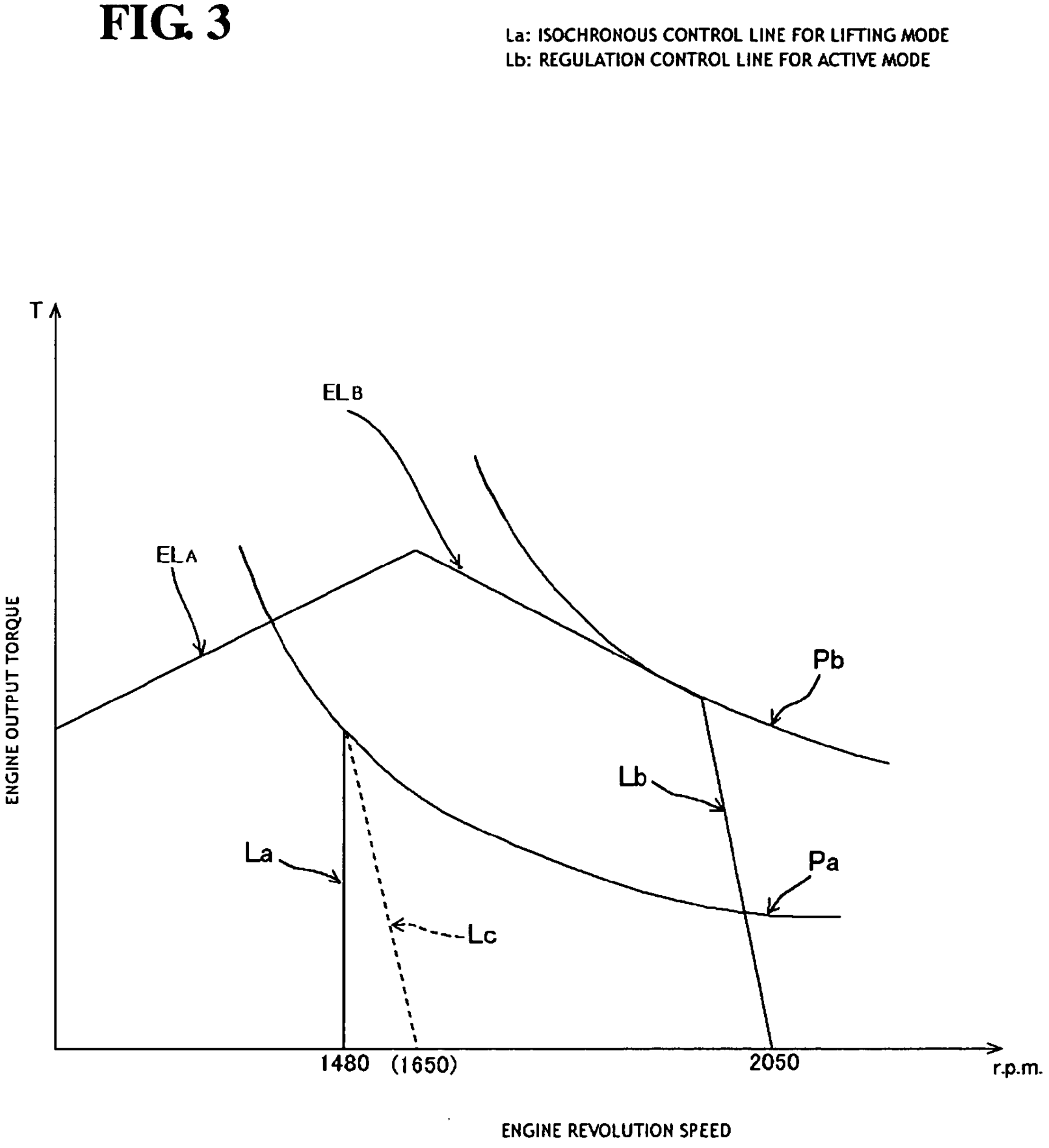
FIG. 3 is an engine output torque characteristic graph according to the first embodiment.

In the hydraulic shovel 1 of the first embodiment configured as described above, if the operator turns ON the lifting mode selector switch 23 among the operation mode selector switches 24, the engine output torque characteristic line designated by $EL_A$ in FIG. 3 is set and the engine control device 18 executes the isochronous control in accordance with the engine revolution speed constant line designated by La in FIG. 3. On the other hand, if the operator turns ON the active mode selector switch 21 among the operation mode selector switches 24, the engine output torque characteristic line designated by $EL_B$ in FIG. 3 is set and the engine control device 18 executes the regulation control in accordance with the inclining load line designated by Lb in FIG. 3. In the excavation mode selected by turning ON the excavation mode selector switch 22, an engine output torque characteristic, with which the set revolution speed is set to a value slightly lower than that of the active mode, is selected, and the control executed by the engine controller 18 is basically the same as the regulation control of the active mode. Therefore, the inclining load line associated with the excavation mode of FIG. 3 is omitted from the drawing for convenience of explanation. In FIG. 3, the broken line designated by Lc is the inclining load line where the isochronous control is not performed but the regulation control is performed in the lifting mode. In FIG. 3, the engine revolution speed in parentheses is the set revolution speed when the regulation control is performed in the lifting mode.

In the present embodiment, since the isochronous control is performed in the lifting mode in which the set revolution speed for the engine 16 is relatively low (set revolution speed: 1480 r.p.m.), the work machine 6 can be easily operated at a constant ultraslow speed even by a relatively rough manipulation, so that the load does not sway while craning operation being carried out and the blade does not deviate from a course during excavation of a sloped land. In the active mode in which the set revolution speed for the engine 16 is set to a relatively high value equal to or in the vicinity of the rated output revolution speed (set revolution speed: 2050 r.p.m.), the regulation control is performed and therefore the operator can sense the degree of work load fluctuation based on increases and decreases in the revolution speed of the engine. This permits the operator to make accurate manipulation in the course of operation so that the operation can be smoothly carried out without troubles. In addition, since the control system of the present invention for achieving the above effect can be relatively simply constructed and does not depend upon the operational feeling of the operator, there is no likelihood that the recall factor of the effect may fluctuate.

Figure 4:
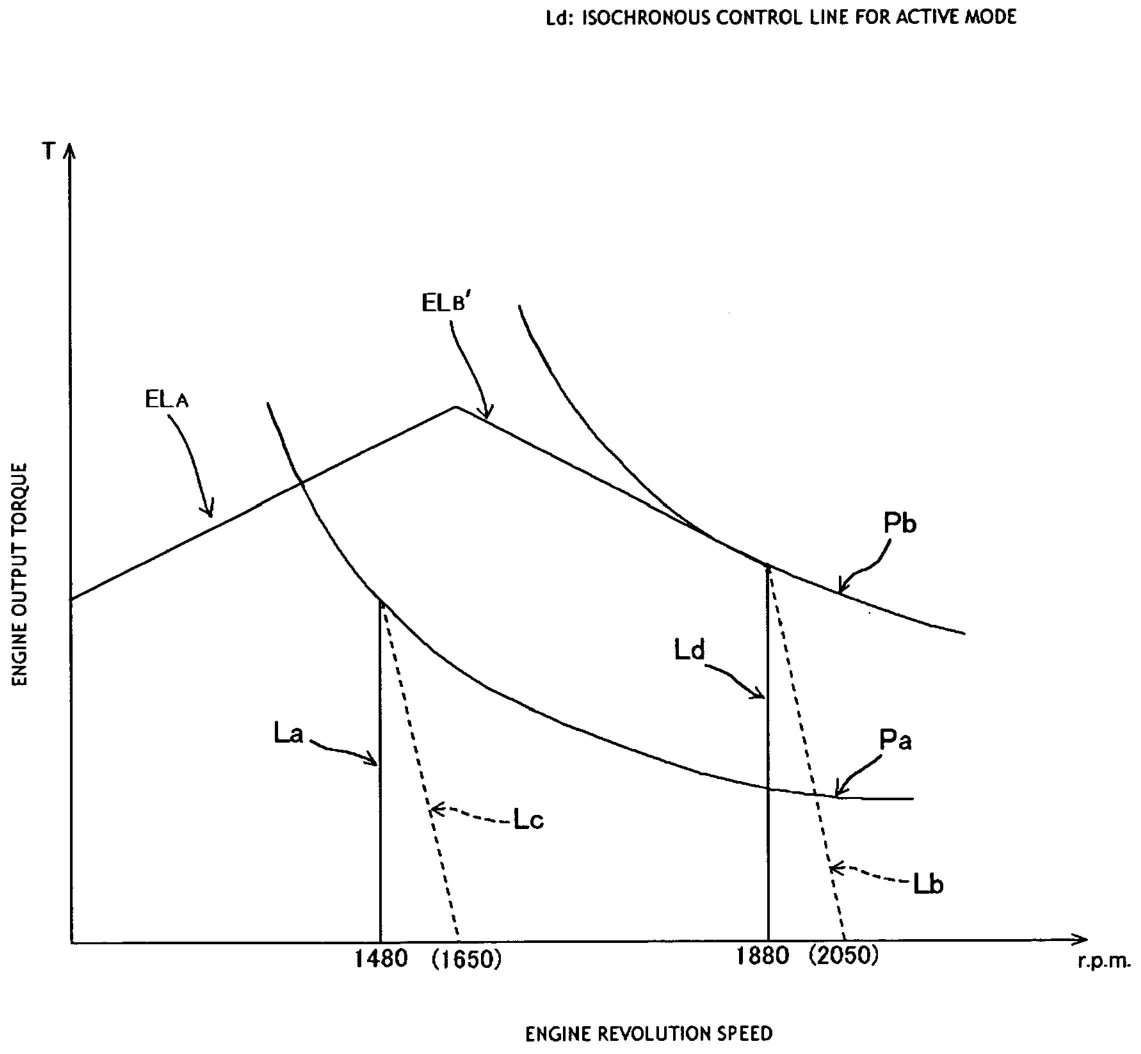
FIG. 4 is an engine output torque characteristic graph according to the second embodiment.

Next, a second embodiment of the invention will be described below. FIG. 4 shows an engine output torque characteristic graph according to the second embodiment. The hardware configuration of the engine/hydraulic control system of the second embodiment is basically the same as that of the first embodiment.

While the first embodiment has been discussed in terms of a case where the isochronous control is executed in the lifting mode whereas the regulation control is executed in the active mode, the second embodiment is designed such that, as shown in FIG. 4, the isochronous control is performed in the lifting mode according to the engine revolution speed constant line designated by Code La like the first embodiment and the isochronous control is also performed, in the active mode, according to the engine revolution speed constant line designated by Code Ld. According to the second embodiment, improved fine controllability can be achieved like the first embodiment. In addition, even if the work machine suddenly comes into an unloaded condition while performing operation in the active mode, the revolution speed of the engine will not increase, and furthermore, the set revolution speed for the engine during unloaded driving itself can be set low, so that vibration and noise can be reduced.

It should be noted that the first and second embodiments may employ the same device as the engine control device 18A of the third and fourth embodiments (described later) in place of the engine control device 18. In the engine control device 18A, a common-rail fuel injection device 40, the engine controller 28 and instruments including various sensors constitute an electronically controlled injection system, as described later.

Figure 5:
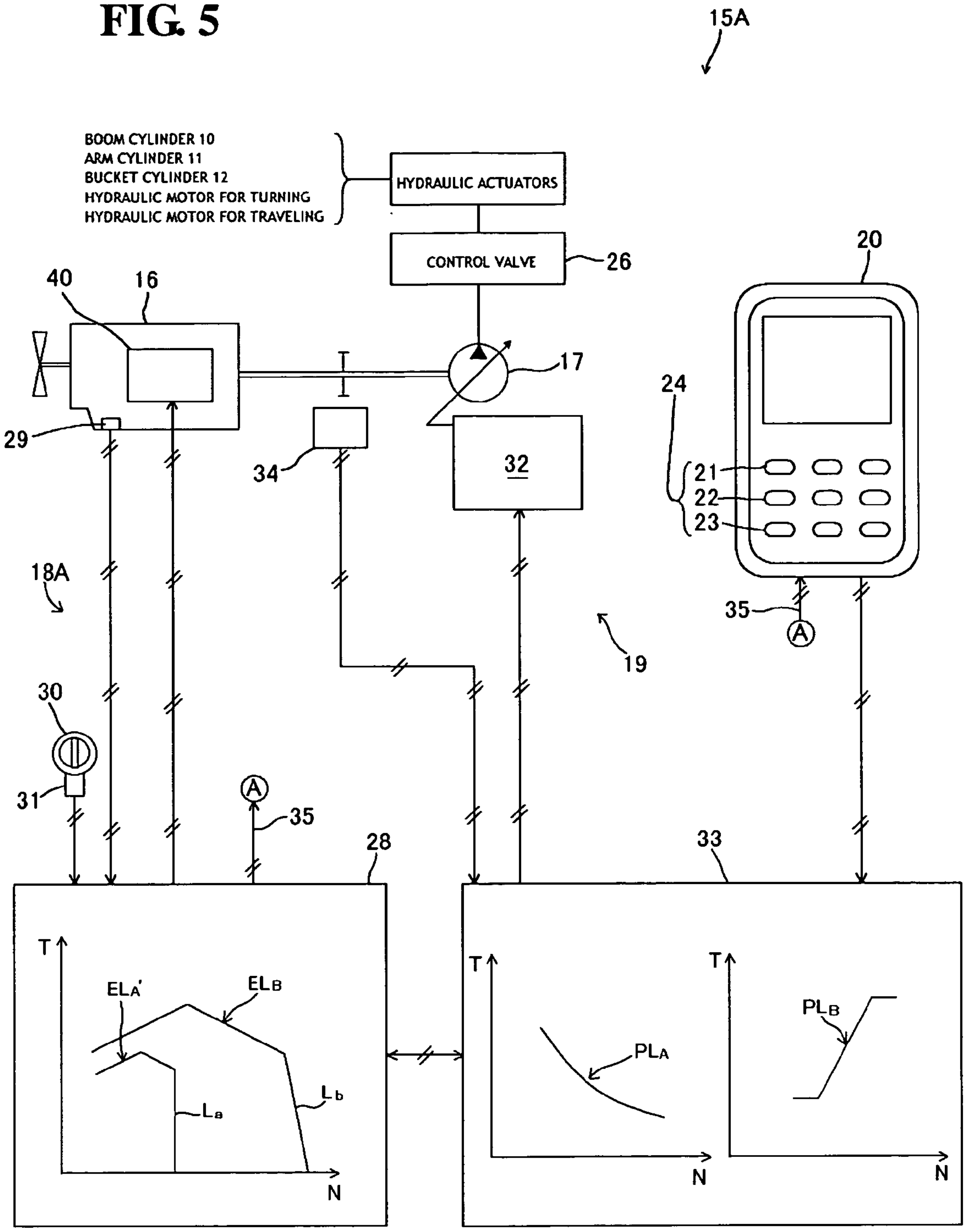
FIG. 5 is a block diagram showing a schematic structure of an engine/hydraulic control system according to a third embodiment.
Figure 6:
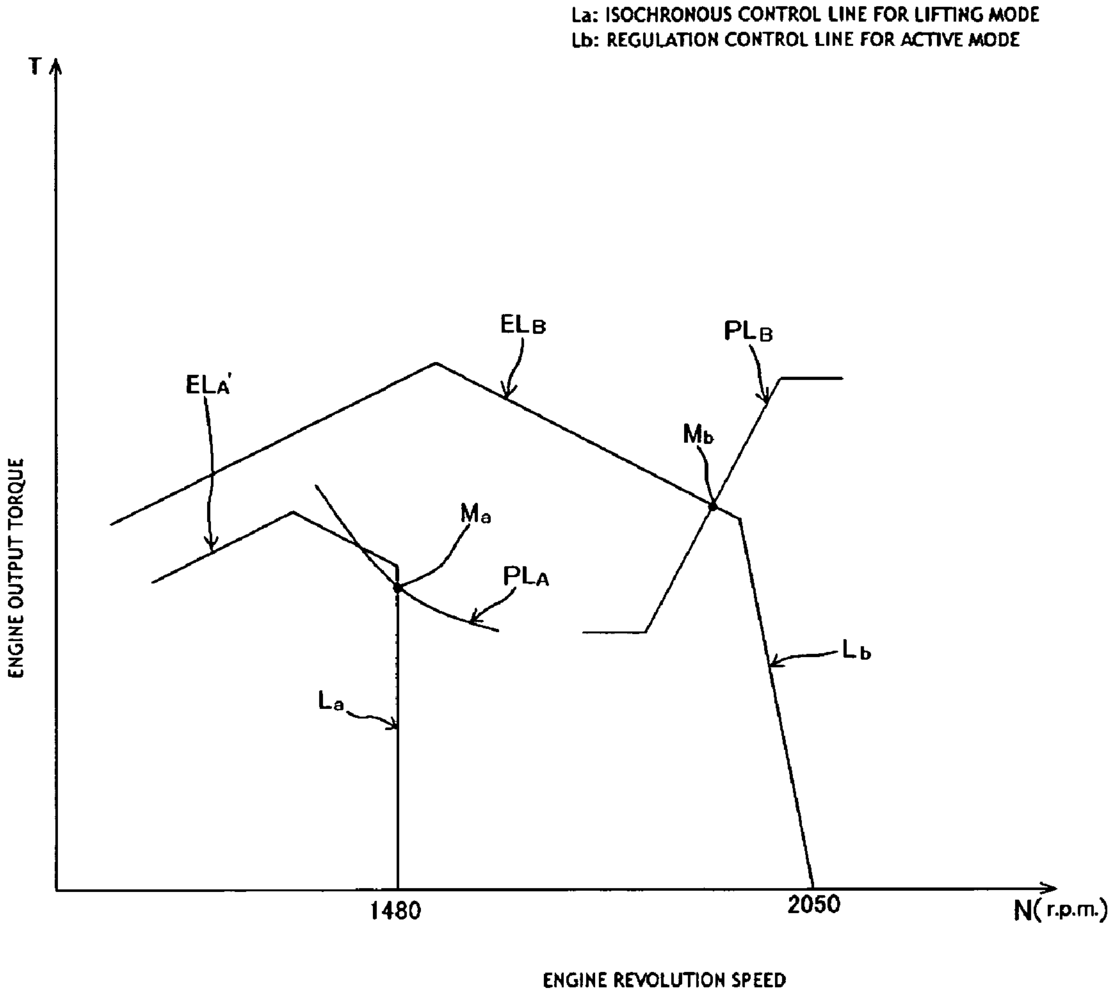
FIG. 6 is an engine output torque characteristic graph according to the third embodiment.

Next, a third embodiment of the invention will be described below. FIG. 5 is a block diagram showing a schematic structure of an engine/hydraulic control system according to the third embodiment. FIG. 6 is an engine output torque characteristic graph according to the third embodiment. In the third embodiment, parts that are identical or similar to those of the foregoing embodiments are once again indicated with the same reference numerals as in the foregoing embodiments. Although a detailed description of them is omitted herein, only parts inherent to the third embodiment will be chiefly explained below.

The engine 16 is equipped with the accumulator (common-rail) fuel injection device 40. The fuel injection device 40 itself is publicly known and therefore a detailed explanation of it with reference to the drawings is omitted herein. The fuel injection device 40 is of a type in which fuel is accumulated in a common rail by a fuel force feed pump and the fuel is injected from an injector by opening/closing of an electromagnetic valve. The fuel injection device 40 is formed such that fuel injection characteristics are determined based on a drive signal sent from the engine controller 28 to the electromagnetic valve so that arbitrary injection characteristics over the range from the low-speed region to high-speed region of the engine 16 can be obtained. In the third embodiment, an electronically controlled injection system, which is composed of the fuel injection device 40, the engine controller 28 and instruments including various sensors, constitutes the engine control device 18A. In such an electronically controlled injection system, target injection characteristics are mapped by digital values, thereby obtaining the engine characteristics described later.

The engine controller 28 stores mapped engine output torque characteristics corresponding to the lifting mode and the active mode, respectively. Herein, in the third embodiment, an engine output torque characteristic line $EL_A$' is set in connection with the lifting mode. The engine output torque characteristic line $EL_A$' has an isochronous control line La and is set such that the output torques of the middle and low speed regions are slightly lower than those of the engine output torque characteristic line $EL_A$. In the third embodiment, an engine output torque characteristic line $EL_B$ having the same regulation line Lb as that of the first embodiment is set, in connection with the active mode. The engine controller 28 obtains a fuel injection amount by looking up a fuel injection characteristic map (not shown) with an engine revolution speed signal based on each engine output torque characteristic map, and then outputs a drive signal indicative of the obtained fuel injection amount to the fuel injection device 40. It is possible to set an engine output torque characteristic line $EL_B$' having the isochronous control line Ld used in the second embodiment, in place of the engine output torque characteristic line $EL_B$ (this is also applied to the fourth embodiment described later).

In the pump controller 33, pump absorbing torque characteristics corresponding to the lifting mode and the active mode respectively are mapped and stored. Herein, in the third embodiment, a pump absorbing torque characteristic line $PL_A$, which undergoes a transition with equi-horse-power, is set in connection with the lifting mode. The pump absorbing torque characteristic line $PL_A$ matches the engine output torque characteristic line $EL_A$' at an output torque point Ma on the isochronous control line La. In the third embodiment, a pump absorbing torque characteristic line $PL_B$, which is a monotonically increasing function with the revolution speed of the engine serving as a variable, is set in connection with the active mode. This pump absorbing torque characteristic line $PL_B$ matches the engine output torque characteristic line $EL_B$ at an output torque point Mb at which the output of the engine 16 has a maximum. The pump controller 33 obtains a swash plate drive signal based on each pump absorbing torque characteristic map and outputs this swash plate drive signal to the swash plate drive unit 32.

In the third embodiment, if the operator turns ON the lifting mode selector switch 23 among the operation mode selector switches 24, the engine output torque characteristic line $EL_A$' shown in FIG. 6 is set, while the pump absorbing torque characteristic line $PL_A$ is set which matches the engine output toque characteristic line $EL_A$' at the output torque point Ma on the isochronous control line La. On the other hand, if the operator turns ON the active mode selector switch 21 among the operation mode selector switches 24, the engine output torque characteristic line $EL_B$ shown in FIG. 6 is set, while the pump absorbing torque characteristic line $PL_B$ is set which matches the engine output torque characteristic line $EL_B$ at the output torque point Mb at which the output of the engine 16 has a maximum.

According to the third embodiment, in the lifting mode, the output torques in the middle and lower speed regions of the engine output torque characteristic line $EL_A$' are slightly lower than the output torques in the middle and lower speed regions of the engine output torque characteristic line $EL_A$ of the first embodiment. Therefore, the third embodiment has not only the same effect as the first embodiment but also an advantage over the first embodiment in terms of the reduction of fuel consumption when the lifting mode is selected.

Figure 7:
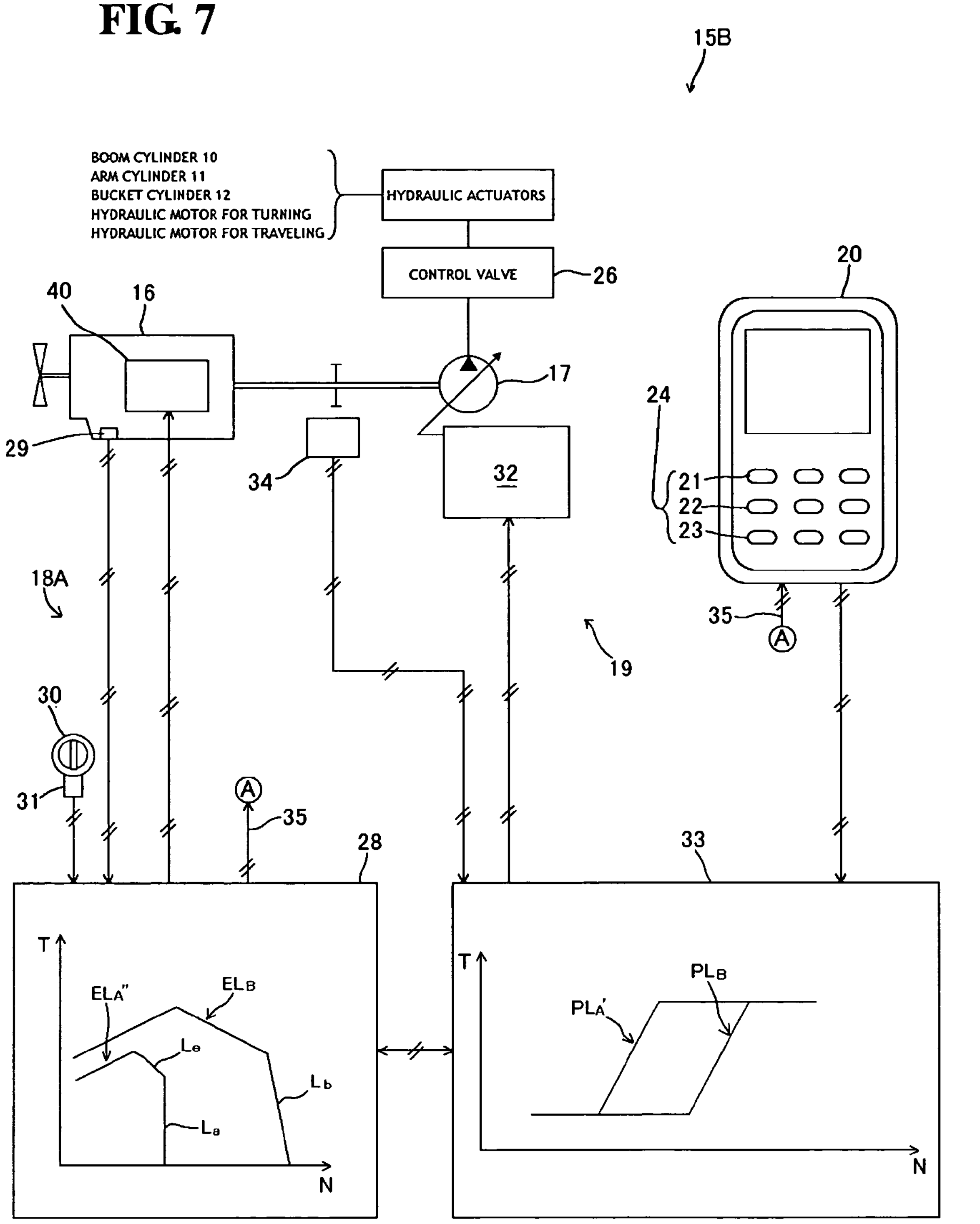
FIG. 7 is a block diagram showing a schematic structure of an engine/hydraulic control system according to a fourth embodiment.
Figure 8:
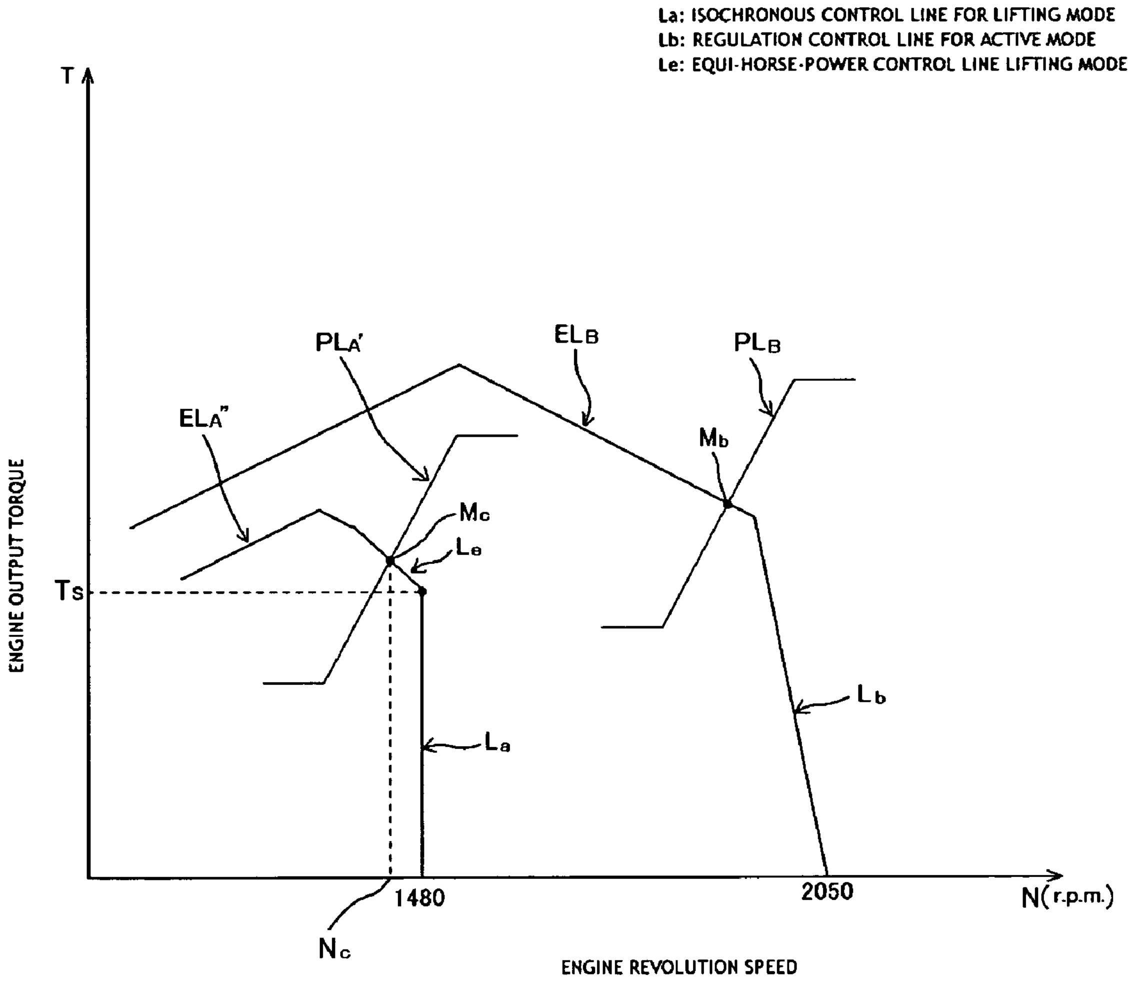
FIG. 8 is an engine output torque characteristic graph according to the fourth embodiment.

Next, a fourth embodiment of the invention will be described below. FIG. 7 is a block diagram showing a schematic structure of an engine/hydraulic control system according to the fourth embodiment. FIG. 8 is an engine output torque characteristic graph according to the fourth embodiment. In the fourth embodiment, parts that are identical or similar to those of the foregoing embodiments are once again indicated with the same reference numerals as in the foregoing embodiments. Although a detailed description of them is omitted herein, only parts inherent to the fourth embodiment will be chiefly explained below.

The engine controller 28 stores an engine output torque characteristic which is represented by the line $EL_A$" shown in FIGS. 7, 8 and mapped as the engine output torque characteristic corresponding to the lifting mode. This engine output torque characteristic line $EL_A$" has the isochronous control line La and is such that the output torques of the middle and low speed regions are slightly lower than those of the engine output torque line $EL_A$. The engine output torque characteristic line $EL_A$" further has a control line Le which leads to the isochronous control line La. Herein, the control line Le is for allowing the output of the engine to undergo a transition with a substantially equi-horse-power (the control line Le is hereinafter referred to as "equi-horse-power control line Le"). According to the engine output torque characteristic line $EL_A$", the engine 16 is once driven according to the isochronous control line La after the load starts to increase from the unloaded condition. If the engine output torque value which the load requires still increases after reaching a specified value Ts, the engine 16 is driven according to the equi-horse-power control line Le.

The pump controller 33 stores the pump absorbing torque characteristic which is represented by the line $PL_A$' in FIGS. 7, 8 and mapped as a pump absorbing torque characteristic corresponding to the lifting mode. This pump absorbing torque characteristic line $PL_A$' is a monotonically increasing function with the revolution speed of the engine serving as a variable and matches the engine output torque characteristic line $EL_A$" at an output torque point Mc on the equi-horse-power control line Le.

In the fourth embodiment, if the operator turns ON the lifting mode selector switch 23 among the operation mode selector switches 24, the engine output torque characteristic line $EL_A$" shown in FIG. 8 is set, while the pump absorbing torque characteristic line $PL_A$' is set which matches the engine output toque characteristic line $EL_A$" at the output torque point Mc on the equi-horse-power control line Le. On the other hand, if the operator turns ON the active mode selector switch 21 among the operation mode selector switches 24, the engine output torque characteristic line ELB shown in FIG. 8 is set, while the pump absorbing torque characteristic line $PL_B$ is set which matches the engine output torque characteristic line $EL_B$ at the output torque point Mb at which the output of the engine 16 has a maximum.

In the fourth embodiment, if the lifting mode is selected, the load starts to increase from the unloaded condition, so that the engine 16 is once driven according to the isochronous control line La. If the engine output torque value which the load requires still increases after reaching the specified value Ts, the engine 16 is driven according to the equi-horse-power control line Le. Then, the actual revolution speed of the engine 16 converges on an engine revolution speed Nc which corresponds to the output torque point Mc (hereinafter referred to as "matching point Mc") at which the engine output torque characteristic line $EL_A$" intersects the pump absorbing torque characteristic line $PL_A$'. During this time, the engine output torque varies according to the equi-horse-power characteristic of the engine 16 itself and therefore increases, while the engine revolution speed is gradually varying in relation with increases in the load. When the output torque of the engine 16 converges upon the matching point Mc, the output of the engine 16 is kept to be the value corresponding to the engine output required at the matching point Mc, so that the engine 16 does not lapse into an excess output.

According to the fourth embodiment, high loaded operation can be carried out in a good condition without loosing fine controllability and fuel consumption can be more effectively cut down when the lifting mode is selected, compared to the third embodiment.

Although the foregoing embodiments have been discussed in terms of a case where the invention is applied to a hydraulic excavator, the invention is obviously applicable to construction machines, industrial vehicles, agricultural machines etc. other than hydraulic excavators.

The invention claimed is:

1. A work machine comprising:

hydraulic actuators activated by pressure oil from a hydraulic pump driven by an engine;

an implement driven by activation of the hydraulic actuators;

an engine control device for controlling output of the engine in accordance with each of a plurality of operation modes which are set according to contents of operations, the plurality of operation modes including a finely-controlled operation mode in which the implement is allowed to operate at ultraslow speed, and a revolution speed operation mode in which a revolution speed for the engine is set to a value in a vicinity of a rated output revolution speed; and operation mode selecting means for selecting any one of the plurality of operation modes, wherein the engine control device is arranged such that when the finely-controlled operation mode has been selected from the plurality of operation modes by the operation mode selecting means, the engine control device performs isochronous control for maintaining the revolution speed of the engine at a substantially constant value irrespective of load fluctuations, and wherein the engine control device is arranged such that when the revolution speed operation mode has been selected from the plurality of operation modes by the operation mode selecting means, the engine control device performs regulation control for increasing or decreasing the revolution speed of the engine according to load fluctuations.

2. The work machine according to claim 1, wherein the engine control device performs equi-horse-power control subsequently to the isochronous control, if an output torque value of the engine which the load requires still increases after reaching a specified value when the finely-controlled operation mode is selected.

3. A work machine comprising:

hydraulic actuators activated by pressure oil from a hydraulic pump driven by an engine;

an implement driven by activation of the hydraulic actuators;

an engine control device for controlling output of the engine in accordance with each of a plurality of operation modes which are set according to contents of operations, the plurality of operation modes including a finely-controlled operation mode in which the implement is allowed to operate at ultraslow speed, and a revolution speed operation mode in which a revolution speed for the engine is set to a value in a vicinity of a rated output revolution speed; and operation mode selecting means for selecting any one of the plurality of operation modes, wherein the engine control device is arranged such that when each of the finely-controlled operation mode and the revolution speed operation mode has been selected from the plurality of operation modes by the operation mode selecting means, the engine control device performs isochronous control for maintaining the revolution speed of the engine at a substantially constant value irrespective of load fluctuations.

4. The work machine according to claim 3, wherein the engine control device performs equi-horse-power control subsequently to the isochronous control, if an output torque value of the engine which the load requires still increases after reaching a specified value when the finely-controlled operation mode is selected.

* * * * *